Feb. 10, 1931.  J. B. ARMITAGE  1,791,747
MACHINE TOOL TRANSMISSION
Filed Nov. 8, 1928
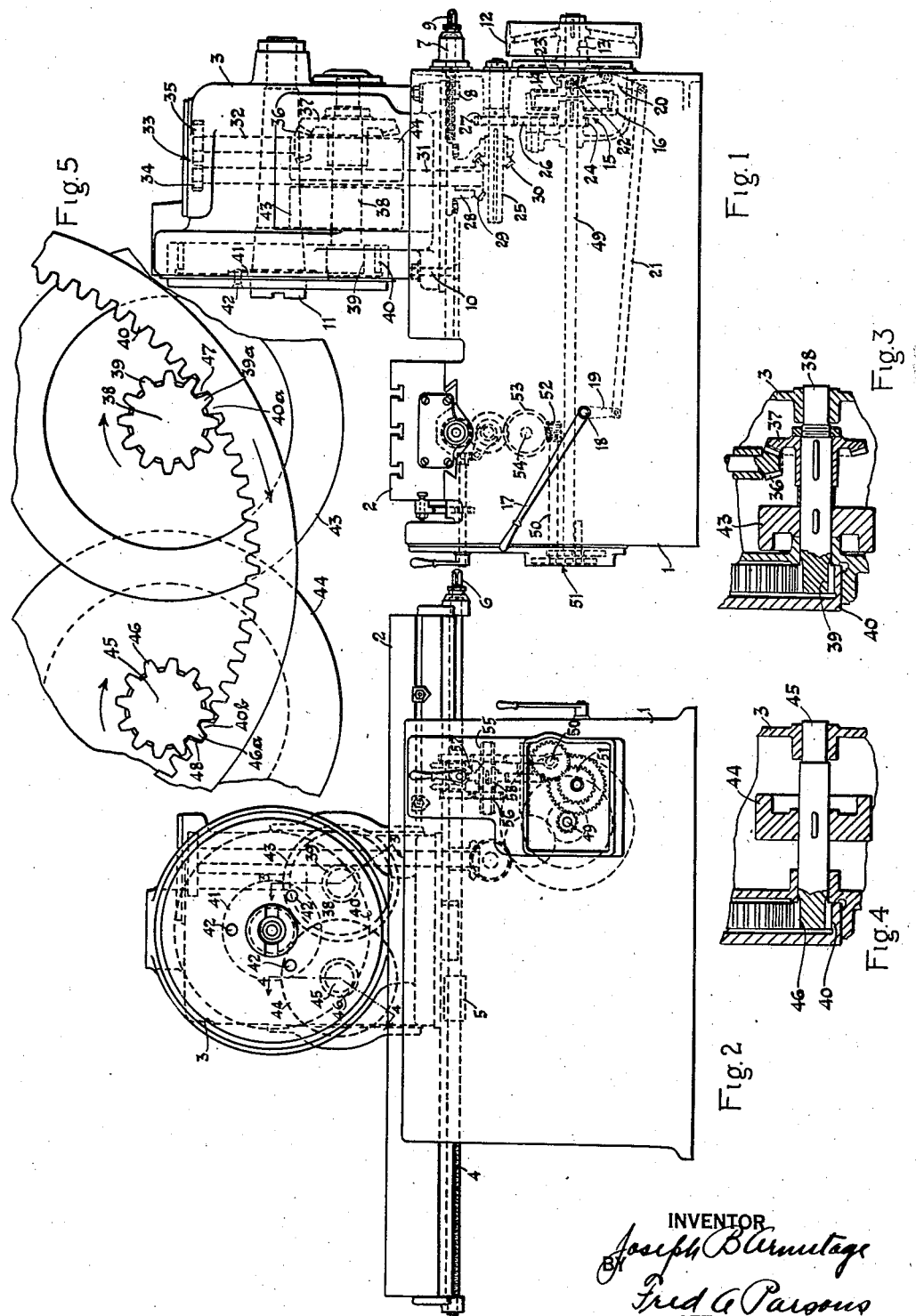
INVENTOR
Joseph B Armitage
BY Fred G Parsons
ATTORNEY Patented Feb. 10, 1931

1,791,747

UNITED STATES PATENT OFFICE

JOSEPH B. ARMITAGE, OF WAUWATOSA, WISCONSIN, ASSIGNOR TO KEARNEY & TRECKER CORPORATION, OF WEST ALLIS, WISCONSIN

MACHINE-TOOL TRANSMISSION

Application filed November 8, 1928. Serial No. 317,928.

This invention relates to machine tools and more particularly to transmission or driving trains therefor.

A purpose of the invention is to provide an improved arrangement adapted to absorb torsional vibrations in a driving train, and to equalize or smooth out power fluctuations of a brief duration therein.

Another purpose relates to providing a transmission including means restraining a driven member against undesired angular displacement relative to other members in spite of possible lost motion which may exist between such driven member and its driving element.

Another purpose relates to the combination of devices and means for the above mentioned purposes whereby both such purposes may be served by mechanism which is at least in part required for the one purpose only.

Another purpose is generally to simplify and improve the construction and operation of machine tool transmissions, particularly the spindle transmission of milling machines, and still other purposes will be apparent from this specification.

The invention consists in the construction and combination of parts as herein illustrated, described and claimed and in such modification thereof as may be equivalent to the claims.

In the accompanying drawings, similar reference characters indicate the same parts in each of the several views, of which:

Fig. 1 illustrates a right side elevation of a milling machine incorporating the invention.

Fig. 2 shows a front elevation of the same machine.

Fig. 3 illustrates a portion of the spindle transmission of the machine, taken in section along line 3—3 of Fig. 2.

Fig. 4 illustrates a portion of the spindle transmission taken along line 4—4 of Fig. 2.

Fig. 5 is a diagrammatic view of a portion of the mechanism of Fig. 2 and enlarged.

The milling machine includes a bed or base 1, providing support for table or work support 2, reciprocably guided thereon and for a head or spindle support or carrier 3, guided on the bed for movement to right or left in Fig. 1, in a direction transverse to the table movement.

Table 2 may be manually moved by means of a screw 4 journaled at its ends in table 2 and restrained for movement therewith and engaging a nut 5 fixed with base 1, screw 4 having a squared end portion 6 adapted to receive a hand crank not shown.

The head 3 may be manually moved by means of a screw 7 rotatably supported from a bed 1 and fixed against axial movement and engaging a nut portion 8 fixed with head 3, the screw 7 having an end portion 9 squared to receive a hand crank, not shown.

Head 3 may be fixed in various positions of adjustment by means of T bolts similar to a bolt 10 and engaging suitable T slots in bed 1.

Rotatably journaled in head 3 is a tool spindle or support 11. A transmission train therefor includes a pulley 12 fixed on a shaft 13 upon which is slidably keyed a clutch member 14 forming a portion of a motion interrupting clutch generally denoted by the numeral 15 and having a member 16 adapted for frictional engagement by member 14 when member 14 is suitably moved. Member 14 may be moved to engage or disengage complementary friction surfaces of members 14 and 16 by means of a hand lever 17 fixed on a shaft 18 upon which is also fixed a lever 19 connecting with a pivoted lever 20 by means of a pivoted rod 21, the lever 20 having a suitable pivoted shoe 22 engaging an annular groove 23 in the extended hub of member 14.

Fixed on the hub of member 16 is a gear 24 which drives a shaft 25 through gears 26—27. A bracket 28 movable with head 3 carries the meshed bevel gears 29—30, gear 30 being slidably splined on the shaft 25, and gear 29 being fixed on a vertical shaft 31. Shaft 31 drives a parallel shaft 32 through a rate changer generally denoted by the numeral 33 and consisting of different diametered gears 34—35 interchangeable on the ends of shafts 31—32 and productive of different speeds according to the position on the different shafts. Fixed on shaft 32 is a bevel pinion 36 meshed with a gear 37 fixed on shaft 38, Figs. 1 and 3, upon which is also fixed a pinion 39 engaging an internal gear 40 which is fixed with spindle 11 by means of a hub 41 and rivets 42, Figs. 1 and 2. Fixed on shaft 38 is a flywheel 43. The mechanism described constitutes a spindle train interruptible by means of clutch 15 and having a flywheel at a relatively high speed point in the train.

A second flywheel 44 is fixed on shaft 45, journaled in head 3, and also fixed on shaft 45 is a pinion 46 meshed with gear 40 to be driven therefrom at a relatively high speed.

Referring to Fig. 5, if the gear 40 be driven from pinion 39 in the direction of the arrow there shown, a pinion tooth such as 39a will be in close contact with gear tooth such as 40a on the driving side of the pinion tooth and the driven side of the gear tooth whereby any lost motion between such teeth will occur at 47. The condition for the driven pinion 46 is somewhat different. A tooth 46a thereof will be driven from a gear tooth such as 40b to maintain any lost motion therebetween at point 48. The flywheels 43—44 provide inertia members respectively connected with the teeth of pinions 39—46 in a manner such that the teeth of pinion 39 resist a relative shifting of gear 40 such as might occur owing to the lost motion at point 48 while the teeth of the pinion 46 resist a relative shifting of gear 40 such as might occur owing to lost motion at point 47. The two flywheels together restrain gear 40 and spindle 11 against any relative displacement in either direction about the axis of spindle 11 which might otherwise be caused by lost motion between the gear teeth. Such shifting may take place but not during a short time interval because of the inertia of the flywheels, thus substantially preventing any angular displacement of the spindle 11 such as would tend to cause or permit chatter.

The gear 40 and spindle 11 may be said to be restrained between two oppositely effective inertia members, each actuated by the spindle train and together effectively restraining the spindle against chatter set up or permitted by lost motion in the driving train in either direction about the spindle axis.

Power mechanism is provided for movement of table 2 which being of conventional form will be only briefly described, as follows:

Shaft 49 is extended forwardly and drives a shaft 50 through a rate changer of suitable form and generally denoted by the numeral 51. Fixed on shaft 50 is worm 52 engaging with a worm wheel 53 fixed on a shaft 54 which drives screw 4 through the one or the other clutch members 55—56 of a reverser of suitable form and generally denoted by the numeral 57 and having a clutch member 58 shiftable to engage with one or the other of clutch members 55—56, connected by the means of suitable gearing for opposite rotation of screw 4 respectively.

What is claimed is:
1. In a machine tool the combination of a rotatable tool spindle, a transmission train for said spindle including a first gear mounted on said spindle, a driving gear for said first gear and having a flywheel connected therewith, and a gear driven from said first gear and having a second flywheel connected therewith.

2. In a milling machine the combination of a rotatable tool spindle, a drive train therefor including a rotatable driving element, and a plurality of inertia members each driven from said drive train, one of said inertia members being connected to drive said element and the other being driven from said element, whereby to restrain said element against relative angular displacement in opposite directions respectively.

3. In a milling machine the combination of a rotatable tool spindle, a power source, a transmission train connecting said source, a motion interrupting clutch, a rate changer, a gear and said spindle in the order recited, said transmission including a flywheel positioned in said train at a point between said rate changer and said gear, a second flywheel, and a train connecting said second flywheel to be driven from said gear.

4. In a machine tool the combination of a rotatable member, a gear fixed thereon, a plurality of pinions each engaging said gear at different points of the gear circumference respectively, a plurality of flywheels respectively associated with the different pinions, and a power train connectible to actuate one of said pinions, the other of said pinions being actuated from said gear.

5. In a milling machine the combination of a rotatable tool spindle, a power source, a transmission train connecting said source, a driving gear, a driven gear and said spindle in the order recited, said gear having lost motion between the engaged teeth thereof, and automatic means substantially preventing relative displacement of said gears from a power transmitting relationship in spite of said lost motion, said means including a device continuously impositively restraining said driven gear from over-running said driving gear.

In witness whereof I have hereto affixed my signature.

JOSEPH B. ARMITAGE.